(12) United States Patent
Hanasato

(10) Patent No.: US 6,840,094 B2
(45) Date of Patent: Jan. 11, 2005

(54) INTAKE PRESSURE SENSING DEVICE FOR INTERNAL COMBUSTION ENGINE

(75) Inventor: Maki Hanasato, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/169,150

(22) PCT Filed: Dec. 28, 2000

(86) PCT No.: PCT/JP00/09445

§ 371 (c)(1),
(2), (4) Date: Jun. 27, 2002

(87) PCT Pub. No.: WO01/48364

PCT Pub. Date: Jul. 5, 2001

(65) Prior Publication Data

US 2003/0000292 A1 Jan. 2, 2003

(30) Foreign Application Priority Data

Dec. 28, 1999 (JP) ............................................. 11-372596

(51) Int. Cl.$^7$ ............................................. G01M 15/00
(52) U.S. Cl. .................................................. 73/117.2
(58) Field of Search ........................ 73/116, 115, 117.2, 73/117.3, 118.2; 701/29; 340/438, 439

(56) References Cited

U.S. PATENT DOCUMENTS

| | | | | |
|---|---|---|---|---|
| 4,428,227 A | * | 1/1984 | Yamagata et al. ............. 73/115 |
| 4,660,408 A | * | 4/1987 | Lewis ....................... 73/28.06 |
| 4,750,464 A | * | 6/1988 | Staerzl ....................... 123/494 |
| 4,787,966 A | * | 11/1988 | Nakajima et al. ............ 204/406 |
| 4,788,958 A | * | 12/1988 | Nakajima et al. ............ 123/674 |
| 4,819,602 A | * | 4/1989 | Mieno et al. ................ 123/688 |
| 4,825,837 A | * | 5/1989 | Nakagawa ................... 123/681 |
| 4,860,712 A | * | 8/1989 | Nakajima et al. ............ 123/697 |
| 4,903,649 A | * | 2/1990 | Staerzl ....................... 123/73 A |
| 4,922,429 A | * | 5/1990 | Nakajima et al. ............ 701/109 |
| 4,958,611 A | * | 9/1990 | Uchinami et al. ............ 123/690 |
| 5,635,635 A | * | 6/1997 | Tsukada et al. ............. 73/118.2 |
| 5,786,531 A | * | 7/1998 | Lewis et al. ................. 73/116 |
| 6,457,353 B1 | * | 10/2002 | Kanke et al. ............... 73/117.3 |
| 6,564,642 B1 | * | 5/2003 | Clifford ....................... 73/718 |

FOREIGN PATENT DOCUMENTS

DE 314 8368 A1 7/1982

OTHER PUBLICATIONS

Patent Abstract of Japanese Patent Publication No. 57–097105, Jun. 16, 1982.
Patent Abstract of Japanese Patent Publication No. 11–298327, Oct. 29, 1999.
Patent Abstract of Japanese Patent Publication No. 09–112316, Apr. 28, 1997.
Patent Abstract of Japanese Patent Publication No. 04–303726, Oct. 27, 1992.

* cited by examiner

Primary Examiner—Eric S. McCall
(74) Attorney, Agent, or Firm—Harness Dickey

(57) ABSTRACT

An intake pressure detecting device for detecting the intake pressure in an intake pipe as information for controlling the operational state of an engine includes an intake pressure detecting sensor for detecting the absolute pressure of the intake air. It further includes a reference voltage power supply for supplying a prescribed reference voltage Vref and a differential amplifier for amplifying the differential between the output voltage Vin from the intake pressure detecting sensor and the reference voltage Vref of the reference voltage power supply. Further, an A/D converter is included for converting the analogue signal output by the differential amplifier to a digital signal. Thereby, the intake pressure can be detected to a high degree of accuracy in a two-cycle engine, for example, which has a relatively low intake negative pressure, while achieving cost reductions.

31 Claims, 7 Drawing Sheets

INTAKE PRESSURE SENSING DEVICE FOR INTERNAL COMBUSTION ENGINE

This application is the national phase under 35 U.S.C. § 371 of PCT International Application No. PCT/JP00/09445 which has an International filing date of Dec. 28, 2000, which designated the United States of America and which claimed priority on Japanese patent application no. JP Hei11-372596 filed Dec. 28, 1999, the entire contents of which are hereby incorporated by reference.

FIELD OF THE INVENTION

The present invention generally relates to an intake pressure detecting device for an internal combustion engine. More preferably, it relates to one for detecting the intake pressure in an intake pipe of an internal combustion engine, or the like. More particularly, it relates to an intake pressure detecting device for an internal combustion engine suitable for detecting the intake pressure of an internal combustion engine, such as a two-cycle, single-cylinder, small exhaust capacity engine, or the like.

BACKGROUND OF THE INVENTION

In a four-cycle internal combustion engine mounted in an automobile, or the like, generally, an electronically controlled fuel injection system is employed for injecting fuel by use of electronic control. In this system, as illustrated in FIG. 9 for example, a basic fuel injection amount is determined from the intake air volume flowing in the air valve and the rotational speed of the engine. Further, a fuel injection amount suited to respective operational states of the engine is determined, by making various increase corrections according to engine operation information, such as water temperature, intake air temperature, throttle opening, and the like, or by making an air/fuel ratio correction by detecting the amount of oxygen in the exhaust pipe by using an oxygen sensor.

As a way to detect the intake air volume, an intake negative pressure sensor type (D-jetronic) intake air pressure detecting device is known. This intake air pressure detecting device is based on the principle that the engine charging efficiency is directly proportional to the intake pipe pressure. Hence, it determines the absolute pressure in the intake pipe, and then determines the intake air volume by deriving the air density taken in from the found absolute pressure and the separately measured air temperature, on the basis of the Boyle-Charles law.

In a four-cycle multiple cylinder engine mounted in an automobile, or the like, generally, a composition is adopted whereby the number of throttle valves is less than the number of cylinders, on the upstream side of the intake path, in order to adjust the intake air volume. The intake of air is then routed to the plurality of cylinders via this one or two throttle valves.

In this composition, if the degree of opening of the throttle valve is very slight, then the pressure in the intake pipe (intake pressure) is very low. For example, in some cases, it may be lower than approximately −80 kPa (gauge pressure). If, on the other hand, the load on the engine is great and the throttle valve is completely open, then the pressure in the intake pipe will rise to practically atmospheric pressure, in other words, approximately 0 kPa (gauge pressure). In engines equipped with a supercharger, it will be pressurized to approximately +101.32 kPa (gauge pressure).

Therefore, an intake pressure detecting device for detecting the absolute pressure in an intake pipe of an engine of this kind is set so as to measure a range from approximately 20 kPa (absolute pressure) to approximately 106.7 kPa (absolute pressure), which is the atmospheric pressure level under high pressure conditions, or approximately 200 kPa (absolute pressure) in order to be compatible with a supercharged engine.

An intake pressure detecting sensor constituting an intake pressure detecting device of this kind has been developed, which operates with a single DC +5V power source and also has an output voltage in the range of DC 0–5V, in order to achieve satisfactory interfacing, and which has the linear characteristics shown in FIG. 10. The conventional range of use of this intake pressure detecting sensor covers the wide region illustrated by S in FIG. 10.

In a system using the aforementioned intake pressure detecting sensor, the analogue signal of the output voltage corresponding to pressure detected by the intake pressure detecting sensor 1 is converted to a digital signal by the A/D converter 2, as illustrated by the block diagram in FIG. 11. Calculation of the intake air volume, and the like, is performed by a CPU 3 on the basis of this digital signal, and the like.

The A/D converter 2 is connected to a 5V power supply 4 forming a reference voltage, and the analogue signal of the intake pressure detecting sensor 1 is converted to a digital signal on the basis of this reference voltage. Here, if the resolution of the A/D converter 2 is 8 bits, for example, then the input voltage in the range of 0–5V is converted to a digital value in the range of 0–255.

An engine mounted in a motorcycle, snowmobile, leisure boat, or the like, will often have fewer cylinders than an engine mounted in an automobile, or the like. Further, it may be a two-cycle engine instead of a four-cycle engine. Therefore, if a conventional intake pressure detecting device of the aforementioned kind is used directly in an engine mounted in a motorcycle, snowmobile, leisure boat, or the like, then problems of the following kind arise.

Specifically, in a motorcycle, snowmobile, leisure boat, or the like, in some cases, a throttle valve is provided for each cylinder in a multiple cylinder engine, in order to emphasize accelerator response. Therefore, the pressure inside the intake pipe increases markedly. In other words, the negative pressure in the intake pipe declines markedly, compared to cases where fewer throttle valves than the number of cylinders are provided, as in the prior art. Further, in a two-cycle single-cylinder engine having a small exhaust capacity, for example, the pressure in the intake pipe may only fall to approximately −20 kPa (gauge pressure), at minimum.

Consequently, if the conventional intake pressure detecting device is used directly, then in the narrow pressure range of −20 kPa to 0 kPa (gauge pressure), the sensor output will have the narrow range indicated by L in FIG. 10 (approximately 3.2–4.0V), and approximately ⅕ of the original measurement range will actually be used. Therefore, the detectable pressure range (1 LSB) will be a relatively large value of approximately 0.51 kPa, which means that the detection sensitivity will decline and control of the fuel injection amount of the engine, and the like, becomes difficult.

Furthermore, assuming that the sensor output corresponding to the output range of −20 kPa to 0 Kpa as described above is amplified directly, then the input voltage range of the A/D converter 2 can easily be exceeded, even at a low amplification factor, and hence pressure detection becomes difficult.

If, on the other hand, the resolution of the A/D converter 2 is increased, from 8 bits to 10 bits, for example, then it becomes possible to detect pressure change up to the level of approximately 0.13 kPa. However, costs increase, software processing becomes more complicated, and the S/N ratio of the control circuit must be set to a high value.

Moreover, if used in a location of high altitude above sea level, such as in a snowmobile, it is necessary to use an intake pressure detecting sensor as an altimeter to measure atmospheric pressure. Furthermore, problems arise in that the measurement range of the intake pressure detecting sensor is narrowed due to the decline of the pressure in the intake pipe at high altitude, and the like.

SUMMARY OF THE INVENTION

An embodiment of the present invention was devised with the foregoing problems of the prior art in mind. An object thereof may be to provide an intake pressure detecting device for an internal combustion engine whereby the pressure in the intake pipe can be detected to a high degree of sensitivity. Further, in one embodiment, the fuel injection volume, and the like, can be controlled with high precision, whilst achieving cost reductions. This can be done, for example, by applying an intake pressure detecting sensor developed for use in an internal combustion engine mounted in an automobile, or the like, which obtains sufficient negative pressure in the intake pipe, to an internal combustion engine, such as a single-cylinder engine, small exhaust capacity engine, two-cycle engine, or the like, which does not obtain sufficient negative pressure in the intake pipe.

The intake pressure detecting device for an internal combustion engine according to an embodiment of the present invention, is an intake pressure detecting device for an internal combustion engine for detecting the intake pressure in the intake pipe as information for controlling the operational state of the internal combustion engine. In one embodiment, it includes an intake pressure detecting sensor for detecting the absolute pressure of the intake air; a reference voltage power supply for supplying a prescribed reference voltage; a differential amplifier for amplifying the differential between the output voltage from the intake pressure detecting sensor and the reference voltage from the reference voltage power supply; and an A/D converter for converting the analogue signal output by the differential amplifier into a digital signal.

According to this composition, firstly, the absolute pressure of the intake air in the internal combustion engine may be detected by the intake pressure detecting sensor, and a voltage corresponding to the detected pressure may be output. This output voltage and a reference voltage may then be input to the differential amplifier, which amplifies the differential therebetween by a prescribed amplification factor. The amplified analogue signal can then be routed to an A/D converter and converted to a digital signal.

In an embodiment of the present invention, by comparing the output voltage of the intake pressure detecting sensor with a prescribed reference voltage value, amplifying the differential therebetween and inputting same to an A/D converter, the pressure detection sensitivity may be raised even in the case of an A/D converter having low resolution. Thus, a sufficiently small value can be obtained for 1 LSB (Least Significant Bit), in other words, the detectable pressure range. Consequently, even in the case of an internal combustion engine wherein the intake pressure does not fall very low, the intake pressure can be detected to a high degree of accuracy, and hence high-precision control of the fuel injection volume, or the like, can be achieved.

In the foregoing composition, it is possible to adopt a composition whereby the reference voltage of the reference voltage power supply is set to the same voltage as the output voltage output by the intake pressure detecting sensor when a prescribed pressure greater than a standard atmospheric pressure is applied.

According to this composition, even under conditions of high atmospheric pressure exceeding the standard atmospheric pressure, the output of the differential amplifier will not become 0V, and consequently, the input value to the A/D converter will not be clipped to 0V, and accurate intake pressure detection can be performed.

In the foregoing composition, it is possible to adopt a composition which includes a reference voltage adjusting device capable of adjusting the reference voltage of the reference voltage power supply.

According to this composition, by adjusting the reference voltage adjusting device, it is possible to adjust the reference point in such a manner that the output of the differential amplifier becomes 0V, for example, in high pressure conditions exceeding the standard atmospheric pressure.

In the aforementioned composition, it is possible to adopt a composition which includes an amplification factor adjusting device capable of adjusting the amplification factor of the differential amplifier.

According to this composition, by adjusting the amplification factor adjusting device, it is possible to adjust the amplification factor of the differential amplifier to a prescribed value, and hence circuit error, component variations, and the like, can be absorbed.

In the composition including the intake pressure detecting sensor, reference voltage power supply, differential amplifier, and A/D converter, it is also possible to adopt a composition which further includes a storing device for previously storing information relating to the signal output by the differential amplifier when a known prescribed pressure value is applied to the intake pressure detecting sensor; and a calculation processor for calculating the actual intake pressure on the basis of the storage information stored by the storing device and the detection information actually detected by the intake pressure detecting sensor.

According to this composition, by applying known prescribed pressure values, for example, at least two calibration pressure values, to the intake pressure detecting sensor, information relating to the signal output from the differential amplifier, in other words, the actual detection characteristics of the intake pressure detecting sensor and differential amplifier, are previously stored in the storing device.

If the intake pressure detecting device is incorporated into an actual system in this state and the intake pressure is detected, then the actual intake pressure is calculated by the calculation processor on the basis of the information output via the intake pressure detecting sensor, differential amplifier and A/D converter, in other words, the detection information, and the storage information stored in the storing device.

Consequently, if there is a difference between the designed detection characteristics and the actual detection characteristics (namely, a difference between the designed detection characteristics and the actual detection characteristics due to variation in the characteristics of the intake pressure detecting sensor itself, or variation in the calculated resistance of the amplifier circuit, or the like,) then by performing progressive calibration on the basis of calculation processing, it is possible to detect the actual pressure, rather than the pressure based on the design value.

In the foregoing composition, it is possible to adopt a composition which includes a determining device for determining the presence or absence of an information write instruction to the storing device.

According to this composition, since the determining device determines whether or not to issue an information write instruction to the storing device, if the determining device issues an instruction signal, for example, then digital information relating to the output signal from the differential amplifier based on known prescribed pressures is stored in the storing device, whereas if, on the other hand, the determining device issues a no instruction signal, then no storage operation to the aforementioned storing device is implemented.

In other words, calibration data, and the like, can be written on the basis of the determining device, in an inspection process, or the like, during device manufacture.

In the foregoing composition, it is possible to adopt a composition wherein the amplification factor of the differential amplifier is set within a range whereby the amplified output signal does not exceed the input range of the A/D converter.

By adopting this composition, it is possible to utilize the broad scope of the input range of the A/D converter, without saturation, and hence the intake pressure can be detected to a high degree of accuracy.

DETAILED DESCRIPTION OF THE PREFERRED EMBODIMENTS

Below, an embodiment of the present invention is described on the basis of the accompanying drawings.

Figure 1:
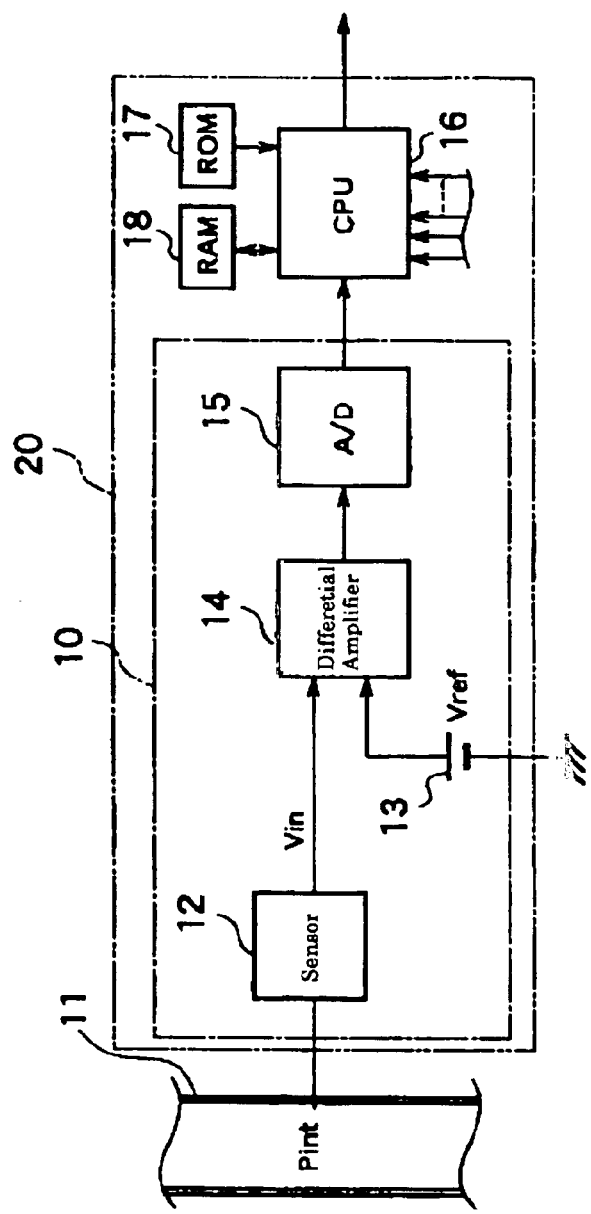
FIG. 1 is a block diagram showing the approximate composition of the intake pressure detecting device relating to an embodiment of the present invention.

FIG. 1 is an approximate compositional view of one embodiment of an intake pressure detecting device for an internal combustion engine relating to the present invention. As illustrated in FIG. 1, the intake pressure detecting device 10 relating to the present embodiment has a basic composition including an intake pressure detecting sensor 12 for detecting the absolute pressure (Pint) of the intake air in the intake pipe 11 of the engine, a reference voltage power supply 13 for supplying a prescribed reference voltage (Vref), a differential amplifier 14 for amplifying the voltage difference ($\Delta V$) between the output voltage from the intake pressure detecting sensor 12, in other words, the sensor voltage (Vin), and the reference voltage (Vref) of the reference voltage power supply 13, an A/D converter 15 for converting the analogue signal for output voltage ($k \cdot \Delta V$) amplified by a prescribed amplification factor (k) and output by the differential amplifier 14, to a digital signal, and the like.

Furthermore, the intake pressure detecting device 10 is principally applied to a fuel injection control system for controlling the fuel injection volume in accordance with the operational state of the engine, and a control system of this kind includes, in addition to the aforementioned intake pressure detecting device 10, a CPU 16 forming a microcomputer for performing various computing processes, a ROM 17 wherein control programs or control data are stored, a RAM 18 for temporarily storing calculation results, or the like, during processing, and the like.

Here, the intake pressure detecting sensor 12 includes a pressure sensor semiconductor (hybrid IC) including an integrated on-chip bipolar operating amp circuit and thin-film resistor network. If pressure is applied to a silicon diaphragm formed on the silicon wafer of the IC, then an analogue signal which is directly proportional to the applied pressure is output, taking a vacuum pressure hermetically sealed behind the silicon diaphragm as a reference pressure.

Therefore, if the intake pressure in the intake pipe 11 of the engine is applied to the silicon diaphragm, the absolute pressure of the intake air can be detected. This intake pressure detecting sensor 12 operates by connection to a single DC +5V power supply, and is set to an output voltage range of 0V–5V.

Figure 2:
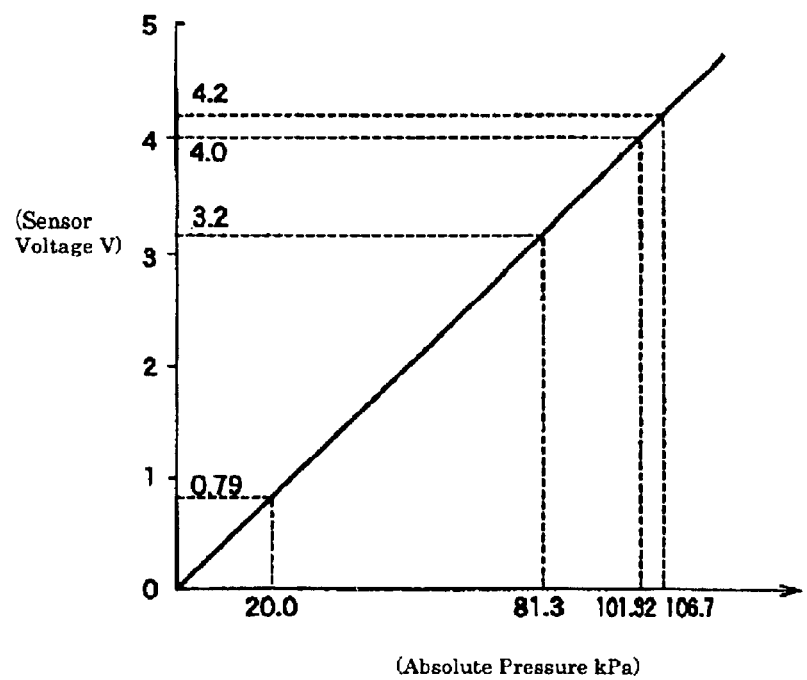
FIG. 2 shows the characteristics of the output voltage with respect to the pressure of the intake pressure detecting sensor constituting a portion of an intake pressure detecting device relating to an embodiment of the present invention.

The characteristics of the output voltage (sensor voltage) with respect to the pressure at the intake pressure detecting sensor 12 are linear characteristics as illustrated in FIG. 2: for example, a signal of approximately 0.79V is output at 20.0 kPa (absolute pressure), approximately 3.23V at 81.3 kPa (absolute pressure), approximately 4.0V at 101.32 kPa (absolute pressure), and approximately 4.2V at 106.7 kPa (absolute pressure).

Moreover, this intake pressure detecting sensor 12 is installed integrally inside an ECU (engine control unit) 20, which also contains the aforementioned CPU 16, ROM 17, RAM 18, differential amplifier 14, A/D converter 15, and other peripheral electronic components, and the like, the intake pressure in the intake pipe 11 being routed to the silicon diaphragm of the intake pressure detecting sensor 12 via a pressure application pipe.

In this way, by installing the intake pressure detecting sensor 12 integrally in the ECU 20, it is possible to perform calibration of the intake pressure detecting sensor 12, and the like, during the ECU 20 inspection process. The intake pressure detecting sensor 12 is not limited to being installed in the ECU 20 as described above, and it may also be disposed separately from the ECU 20.

As shown in FIG. 1, the sensor voltage Vin output by the intake pressure detecting sensor 12 described above and the reference voltage Vref of the reference voltage power supply 13 are input to the differential amplifier 14, which amplifies the differential ΔV between the two voltages (=Vref−Vin) by a prescribed amplification factor (k), and outputs an amplified signal k·ΔV.

Figure 3:
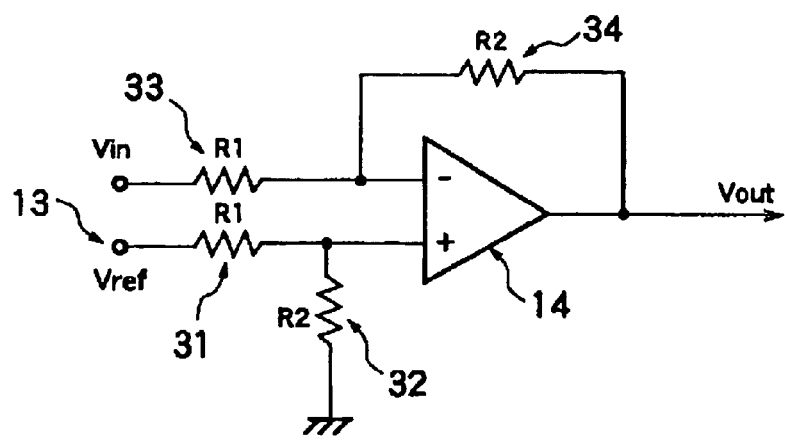
FIG. 3 is a circuit diagram relating to a differential amplifier constituting a portion of the intake pressure detecting device.

Here, to describe the circuitry relating to the differential amplifier 14 in detail, as illustrated in FIG. 3, one end of a resistor 31 having resistance R1 is connected to a non-inverting input terminal of the differential amplifier 14, together with one end of a resistor 32 having resistance R2, and the other end of the resistor 32 is earthed. Furthermore, the other end of the resistor 31 is connected to the reference voltage power supply 13 supplying the reference voltage Vref.

The inverting input terminal of the differential amplifier 14, on the other hand, is connected via a resistor 33 having resistance R1 to the output terminal of the intake pressure detecting sensor 12, and an sensor voltage Vin is input thereto, and one end of the resistor 33 and the output terminal of the differential amplifier 14 are connected via a resistor 34 having resistance R2.

In the aforementioned circuit, the output voltage Vout (in other words, k·ΔV) of the differential amplifier 14 is expressed as Vout=(R2/R1)·(Vref−Vin), and the amplification factor is k=R2/R1. Therefore, by selecting appropriate values for the two resistances R1 and R2, it is possible to amplify the differential ΔV of the two voltages to a prescribed value.

Here, the reference voltage Vref is set in such a manner that the input value to the A/D converter 15 is not clipped at 0V, and the amplification factor (k), namely, the voltage gain, is selected in such a manner that the maximum value of amplified signal, k·ΔV. In other words, the output voltage Vout, does not exceed the input range of the A/D converter 15, as discussed hereinafter, and that the input range is utilized to the maximum.

In other words, as shown in FIG. 2, since the intake pressure detecting sensor 12 outputs a signal of approximately 4.0V at 101.32 kPa (absolute pressure) and 4.2V at 106.7 kPa (absolute pressure), the reference voltage Vref is set to same voltage as the output voltage output by the intake pressure detecting sensor 12 when an atmospheric pressure higher than the standard atmospheric pressure (101.32 kPa). In other words, a pressure greater than the atmospheric pressure at high pressure conditions in a low-altitude location, for example, a pressure of 106.7 kPa, is applied. More specifically, the reference voltage Vref is set to 4.2V.

The reference voltage Vref is not limited to a value of 4.2V, and it is also possible to allow some surplus margin for the atmospheric pressure actually occurring in practical use under normal atmospheric conditions, and hence set the reference voltage Vref to the same voltage as the output voltage from the intake pressure detecting sensor 12 when a pressure of 110.0 kPa or 112 kPa is applied. However, if the surplus margin is excessive, then the amplification factor will be restricted by consequence of the input range of the A/D converter 15, and hence a voltage value of 4.2V corresponding to the aforementioned pressure 106.7 kPa is desirable.

Here, supposing that the reference voltage Vref is set to the same voltage as the output voltage (4.0V) from the intake pressure detecting sensor 12 when the standard atmospheric pressure is applied, then if the intake pressure Pint reaches a pressure exceeding the standard atmospheric pressure, in other words, if a state where the voltage at the non-inverting terminal is less than the voltage at the inverting input terminal occurs, amplification will not be possible with a single power supply, and the output of the differential amplifier 14 will not change and will remain at 0V.

In order to deal with such a situation, in an embodiment of the present invention, a reference voltage having a surplus margin corresponding to a pressure higher than the supposed value of the intake pressure Pint is set. Therefore, when the intake pressure detecting sensor 12 is normal, the voltage at the non-inverting input terminal is always greater than the voltage at the inverting input terminal, and the differential amplifier 14 will always output a value greater than 0V.

In other words, even if the intake pressure is a positive pressure, due to blow back of the intake air in the intake pipe 11, or the like, it is still possible to detect the intake pressure accurately, without causing misdetection.

Moreover, in the event that intake pressure detecting sensor 12 is disconnected, or the like, since pull-up processing for performing control is generally implemented on the safe side of the engine (in the case of a two-cycle engine, for example, the excess fuel side, in order to prevent burning,) then a voltage greater than the reference voltage Vref will be input to the inverting input terminal via a pull-up resistor. Consequently, the non-inverting input terminal voltage will be less than that of the inverting input terminal, and the output from the differential amplifier 14 will be 0V.

Thereby, if the output is 0V, then it is processed as a case where the wiring inside the input intake pressure detecting sensor 12 or the wiring connected thereto has become disconnected. In other words, disconnection, or the like, of the intake pressure detecting sensor 12 can be detected readily.

Figure 4:
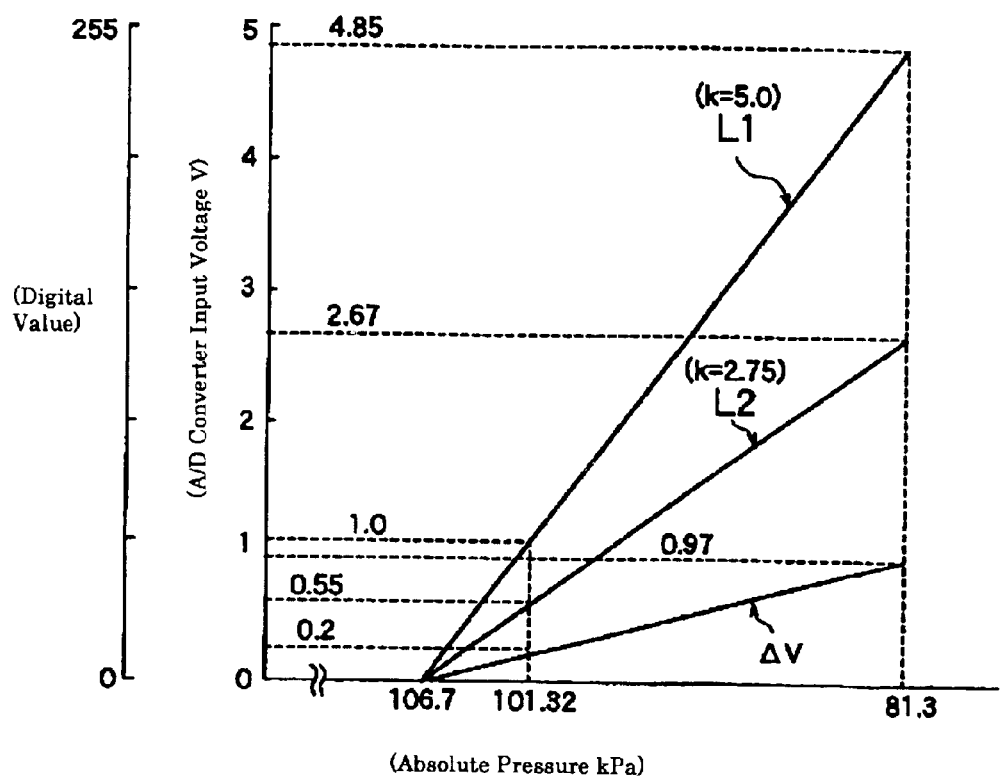
FIG. 4 is a diagram showing the output characteristics of the differential amplifier and the correspondence characteristics of the A/D conversion.

If the reference voltage Vref is set to 4.2V as described above and a graph of the differential ΔV (=Vref−Vin) between the reference voltage Vref and the sensor voltage Vin of the intake pressure detecting sensor 12 is plotted, then the solid line ΔV in FIG. 4 is obtained. As can be seen from these results, the range of the voltage output corresponding to the pressure range of 81.3 kPa–106.7 kPa (absolute pressure) is less than 1V.

Consequently, in order to enable reliable detection by using the broad scope of the input range (0V–5V) of the A/D converter 15, described hereinafter, the application rate k is set to 5.0, for example. If the amplified output voltage Vout in this case, in other words, k·ΔV (=5.0×(Vref−Vin)), is plotted on a graph, the solid line L1 in FIG. 4 is obtained.

By selecting the reference voltage Vref and amplification factor k in this way, it is possible to use the wide scope of the input range of the A/D converter 15 used, without saturation. In particular, it is possible to detect the intake pressure with high accuracy in a motorcycle, leisure boat, or the like, operated at a low-altitude location.

On the other hand, in the case of a snowmobile, or the like, operated at a high altitude, if the amplification factor described above (k=5.0) is used, then cases where the intake pressure cannot be detected may arise. More specifically, if the atmospheric pressure is measured using the aforementioned intake pressure detecting sensor 12, then the sensor voltage Vin at an altitude of around 4000 m will be approximately 2.38V. Therefore, in order that the output voltage Vout of the differential amplifier 14 enters within the 5V input range of the A/D converter 15 in such a case, the amplification factor k must be set to approximately 2.75.

Moreover, since the pressure in the intake pipe during operation of the engine is lower than the aforementioned atmospheric pressure, then if this amplification factor (k=2.75) is used and the snowmobile is used as a maximum altitude of 2500–3000 m above sea level, the intake pressure can be detected. If the snowmobile is operated at a higher altitude, then the amplification factor k must be set to a smaller value.

If the amplification factor k is set to 2.75 as described above, and the amplified output voltage Vout, in other words, k·ΔV (=2.75×(Vref−Vin)) is plotted on a graph, then the solid line L2 in FIG. 4 is obtained.

Thus, by selecting the amplification factor k, it is possible to detect the intake pressure with good accuracy compared to the prior art, even in a location of high altitude above sea level.

In the A/D converter 15, a 5V power supply is connected as a reference voltage. The analogue signal (k·ΔV) input from the differential amplifier 14 is converted to a digital signal, indicating a discrete value, on the basis of this reference voltage.

Here, the resolution of the A/D converter 15 is 8 bits, and consequently, the voltages in the range 0V–5V are previously assigned 255 ($2^8$−1) binary codes, the analogue input signal from the differential amplifier 15 is compared with the reference voltage, and the corresponding binary code is found and output as a prescribed digital signal.

In other words, looking at the example in FIG. 4, if the amplification factor k is 5.0, then the amplified output voltage k·ΔV will range from 0V to approximately 4.85V, and hence a pressure range of 0.103 kPa (25.4 kPa/((4.85/5)×255)=0.103 kPa) per LSB can be detected.

Thereby, it is possible to represent the intake pressure in a range of 81.3 kPa–101.32 kPa, for example, as approximately 194 engine states, compared to 39 states in the prior art. Consequently, the precision of engine control can be improved accordingly.

Furthermore, if the amplification factor k is 2.75, then the amplified output voltage k·ΔV will range from 0V to approximately 2.67V, and hence a pressure range of 0.187 kPa (25.4 kPa/((2.67/5)×255)=0.187 kPa) per LSB can be detected.

Thereby, it is possible to represent the intake pressure in a range of 81.3 kPa–101.32 kPa, for example, as approximately 108 engine states, compared to 39 states in the prior art. Consequently, the precision of engine control can be improved accordingly.

Here, the resolution of the A/D converter 15 is taken as 8 bits, but it is also possible to a device having another bit number, such as 10 bits.

Figure 5:
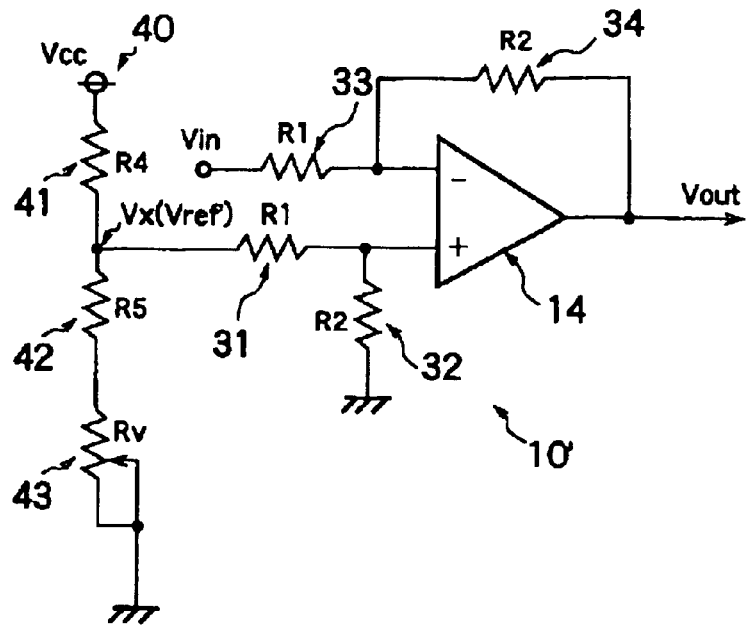
FIG. 5 is a circuit diagram relating to the differential amplifier of the intake pressure detecting device relating to a further embodiment provided with reference voltage adjusting device.

FIG. 5 shows a further embodiment of an intake pressure detecting device relating to the present invention, wherein the reference voltage adjusting device for adjusting the reference voltage of the reference voltage power supply is also provided in the embodiment described previously.

In other words, in the circuitry relating to the differential amplifier 14 of the intake pressure detecting device 10' relating to this embodiment, as illustrated in FIG. 5, one end of a resistor 31 having resistance R1 is connected to the non-inverting input terminal of the differential amplifier 14, along with one end of a resistor 32 having resistance R2, and the other end of the resistor 32 is earthed.

Moreover, a power supply 40 having a prescribed voltage Vcc (for example, 5V) is provided, and a resistor 41 having resistance R4, a resistor 42 having resistance R5, and a variable resistor (potential trimmer) 43 having a variable resistance Rv are connected sequentially in series to the power supply 40, and one end of the variable resistor 43 is grounded. The other end of the resistor 31 is connected to the dividing point between the resistor 41 and resistor 42.

The output terminal of the intake pressure detecting sensor 12 is connected to the inverting input terminal of the differential amplifier 14 via a resistor 33 having resistance R1, similarly to the foregoing embodiment, and the sensor voltage Vin is input thereto. The end of the resistor 33 and the output terminal of the differential amplifier 14 are connected via a resistor 34 having resistance R2.

In the aforementioned composition, the voltage Vx at the dividing point between the resistor 41 and the resistor 42 is a reference voltage Vref' which is input to the non-inverting input terminal of the differential amplifier 14. This voltage Vx, namely, the reference voltage Vref', is determined by the ratio between the resistance R4 of the resistor 41, and the resistance R5 of the resistor 42 plus the resistance Rv of the variable resistor 43, in other words, the ratio between R4 and R5+Rv. Consequently, this ratio can be adjusted suitably by adjusting the variable resistor 43, and hence the value of the reference voltage Vref' can be adjusted to a prescribed value, or it can be adjusted in such a manner that variation is absorbed so as to match a prescribed reference voltage.

In other words, the reference voltage adjusting device capable of adjusting the reference voltage of the reference voltage power supply includes the aforementioned power supply 40, resistor 41, resistor 42, and variable resistor 43.

Figure 6:
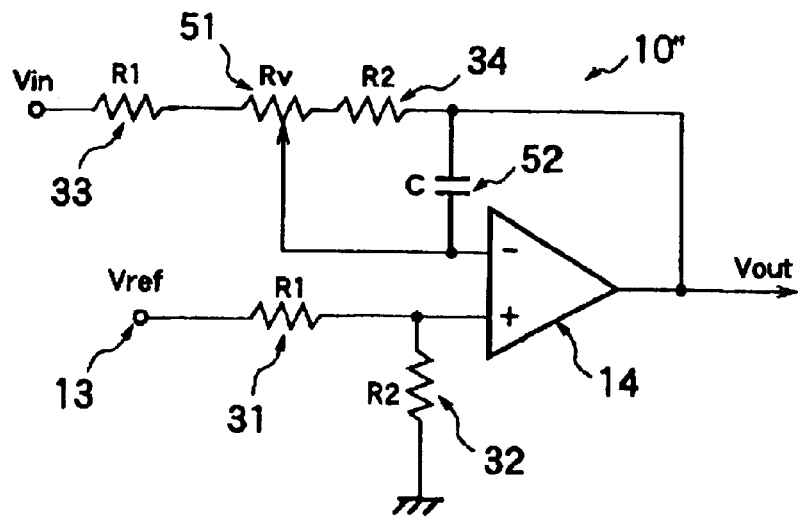
FIG. 6 is a circuit diagram relating to the differential amplifier of the intake pressure detecting device relating to a further embodiment provided with amplification factor adjusting device.

FIG. 6 shows yet a further embodiment of an intake pressure detecting device relating to the present invention, and in this embodiment, an amplification factor adjusting device for adjusting the amplification factor k of the differential amplifier 14 is provided.

More specifically, in the circuitry relating to the differential amplifier 14 of the intake pressure detecting device 10" relating to this embodiment, as shown in FIG. 6, one end of an resistor 31 having resistance R1 is connected to the non-inverting input terminal of the differential amplifier 14, together with one end of a resistor 32 having resistance R2, the other end of the resistor 32 being earthed. The other end of the resistor 31 is connected to a reference voltage power supply 13 supplying a reference voltage Vref.

The inverting input terminal of the differential amplifier 14, on the other hand, is connected to a moving contact terminal of a variable resistor 51 (potential trimmer) and one end of a capacitor 52 of capacitance C, which are included in the amplification factor adjusting device. One end of this variable resistor 51 is connected to the output terminal of the intake pressure detecting sensor 12 via a resistor 33 having resistance R1, and the other end of the variable resistor 51 is connected to the output terminal of the differential amplifier 14 via a resistor 34 having resistance R2, the other end of the capacitor 52 being connected to the output terminal of the differential amplifier 14.

In the aforementioned composition, by adjusting the moving contact point of the variable resistor 51 appropriately, error in the circuitry, and the like, can be absorbed and the amplification factor k can be adjusted to a prescribed value.

In the respective embodiments described above, cases where a reference voltage adjusting device and/or amplification factor adjusting device are provided, respectively and separately, are described, but it is of course possible for these devices to be provided conjointly.

Moreover, in the differential amplifier 14 and A/D converter 15 in the various embodiments described above, it is assumed that no negative voltage is handled and the input range is 0V–5V, the voltage differential ΔV (=Vref−Vin) being amplified as a positive voltage. However, the invention is not limited to the detailed composition described above, if the A/D converter 15 is bipolar input type A/D converter, or if the differential amplifier 14 itself is provided with a positive/negative power supply, or if the intake pressure detecting sensor 12 has different output characteristics to those described above, etc.

The CPU 16 (central processing unit) forming the kernel of the control system is an 8-bit, 16-bit or 32-bit microcomputer, or the like. In addition to the intake pressure information output by the aforementioned A/D converter 15, this CPU 16 may also receive input of intake temperature information detected by an intake temperature sensor, engine revolution speed (number of revolutions) and crank position information detected by an crank angle sensor, throttle opening information detected by a throttle opening sensor, cooling water temperature information detected by a water temperature sensor, oxygen density information detected by an oxygen sensor, and the like, each of these information elements being A/D converted to a digital signal before input.

A control program and control maps (control data), such as an air/fuel ratio map set previously by experimentation, an ignition timing map, and the like, may be stored in the ROM 17.

In other words, the CPU 16 compares and calculates the data read from the ROM 17 and the information for the respective sensors, whilst temporarily storing intermediate calculation results, and the like, in a RAM 18, and it determines the engine operating conditions at each respective moment. In other words, it determines the optimum ignition timing, fuel injection volume, fuel injection timing, and the like, and outputs control signals to the injector, ignition coil, and the like, by means of an output interface circuit.

The input signal from the A/D converter 15 described above is the differential pressure of the pressure with respect to the reference voltage, rather than the absolute pressure of the intake air. Therefore, the absolute pressure value of the intake air is calculated by performing a calculation which accounts for the pressure corresponding to the reference voltage Vref, and the intake air volume is determined by the Boyle-Charles law on the basis of the absolute intake pressure thus obtained and the intake temperature. The basic fuel injection volume is determined from the intake air volume and the engine revolution speed.

Moreover, if reference voltage adjusting devices are provided and the reference voltage Vref' is adjusted appropriately, then information relating to the adjusted reference voltage Vref' is previously read in, the absolute pressure value of the intake air is calculated by performing calculations which take account of the information thus input.

The aforementioned intake pressure detecting sensor 12 usually detects the absolute pressure of the intake air in the intake pipe 11, but it is also able to detect the atmospheric pressure (absolute value) in conditions where the engine is not operating. Consequently, if the intake pressure detecting device 10, 10', 10" is used in the engine of a snowmobile, or the like, then the intake pressure detecting device can be used as an altimeter.

Since two types of information can be detected by a single intake pressure detecting sensor 11 in this way, the requirement for sensor equipment is reduced accordingly, and the cost of the overall system can be reduced, in addition to which, the input ports of the A/D converter are not overly occupied, and the corresponding freed input port can be used effectively for other information. Furthermore, by detecting the pressure when the engine is idle as described above to find the atmospheric pressure (absolute value) under these conditions, it is possible to perform atmospheric pressure correction with respect to various elements of operating information.

Next, the operation of a control system including the intake pressure detecting device relating to the present embodiment is described.

Firstly, when the pressure in the intake pipe 11 (having a relatively small negative pressure level) is detected by the intake pressure detecting sensor 12, this detection signal (sensor voltage) Vin is input to the differential amplifier 14.

The difference $\Delta V$ between the reference voltage Vref (Vref') and the sensor voltage Vin is amplified by amplification factor k, and the output voltage Vout (namely, $k \cdot \Delta V$)= $k \cdot (Vref-Vin)$ is output from the differential amplifier 14.

The amplified output voltage Vout is then input to the A/D converter 15 and converted to a digital signal. More specifically, by amplifying the difference between a prescribed reference voltage value and the output voltage of the intake pressure detecting sensor, and inputting this difference to an A/D converter, the pressure detection sensitivity is raised even in the case of a low-resolution A/D converter, and a sufficiently small value is achieved for the pressure range detectable per LSB (least significant bit).

The converted digital signal is input to the CPU 16 and subjected to prescribed conversion processing, whereupon it is entered into a calculation based on the Boyle-Charles law, together with the separately detected intake temperature signal, in order to determine the intake air volume.

A basic fuel injection volume is determined according to the intake air volume thus calculated and the separately detected engine revolution speed.

The information from the various other sensors is compared with control maps (control data), such as air/fuel ratio maps, ignition timing maps, and the like, previously determined by experimentation, and entered into various calculations in order to determine the engine operating conditions, in other words, the optimum ignition timing, fuel injection volume, fuel injection timing, and the like, at each particular instant.

The control signals thus calculated are output to the injector, ignition coil, and the like, by an output interface circuit for example.

According to the foregoing procedure, highly accurate control of the fuel injection volume, and the like, can be achieved, even in the case of an engine generating an intake pressure with a relatively low negative pressure level.

Figure 7:
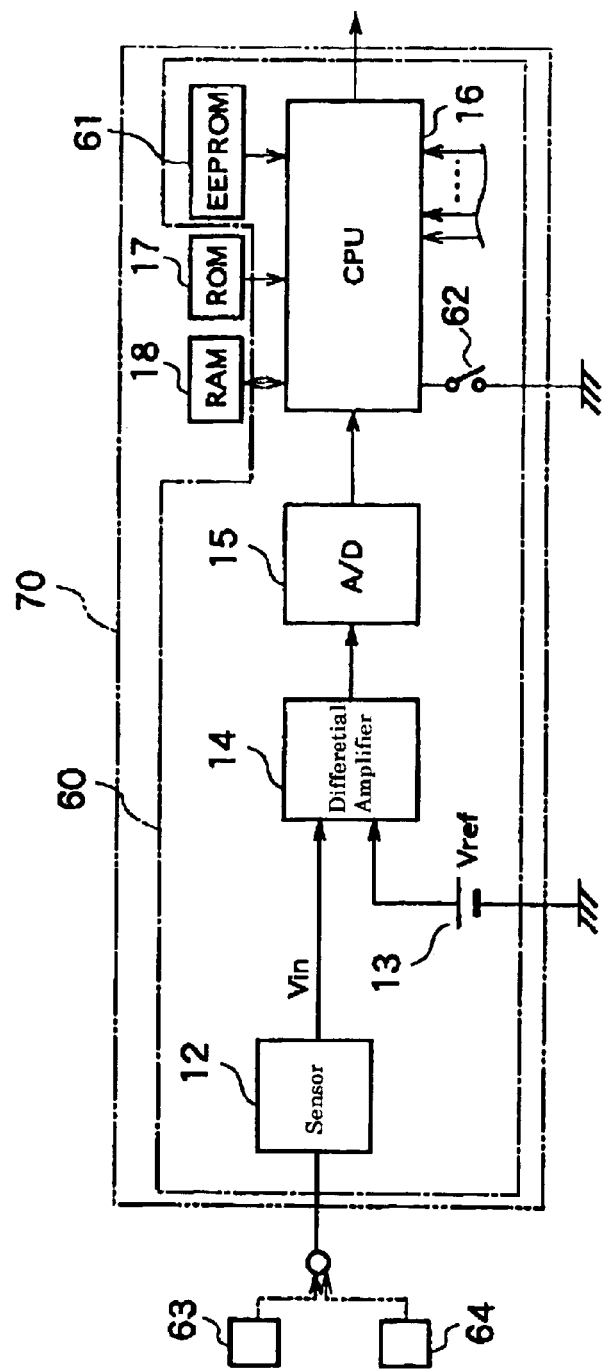
FIG. 7 is a block diagram showing the approximate composition relating to a further embodiment of the intake pressure detecting device according to an embodiment of the present invention.
Figure 8:
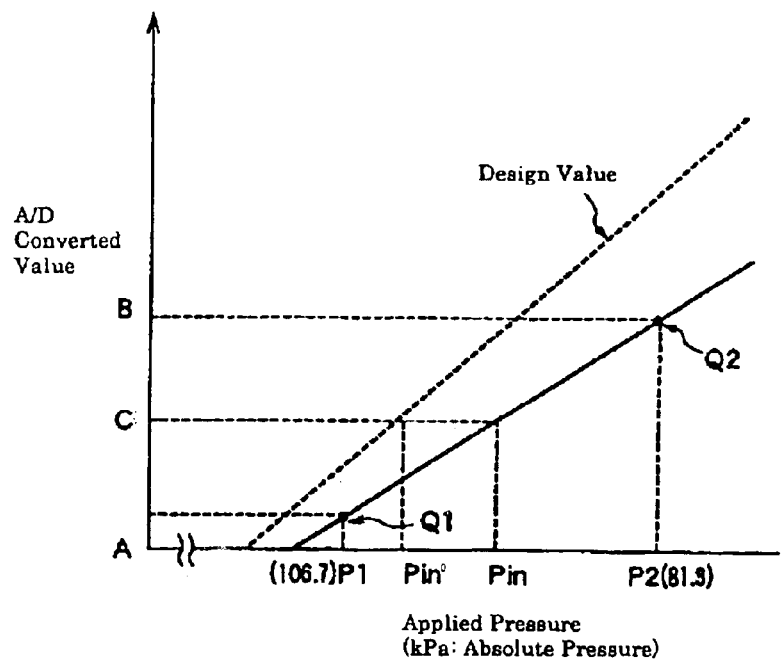
FIG. 8 is a diagram showing the detection characteristics of the intake pressure detecting device shown in FIG. 7.
Figure 9:
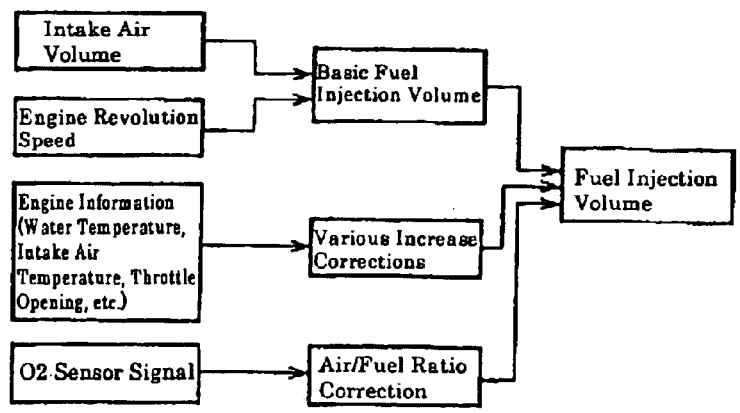
FIG. 9 is a block diagram showing a conventional fuel injection volume control system in an engine.
Figure 10:
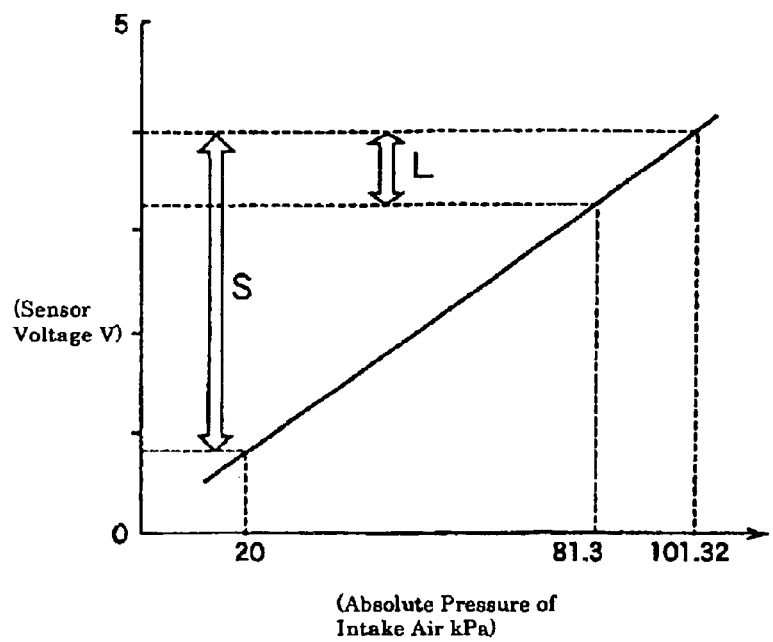
FIG. 10 shows conventional intake pressure detection characteristics.
Figure 11:
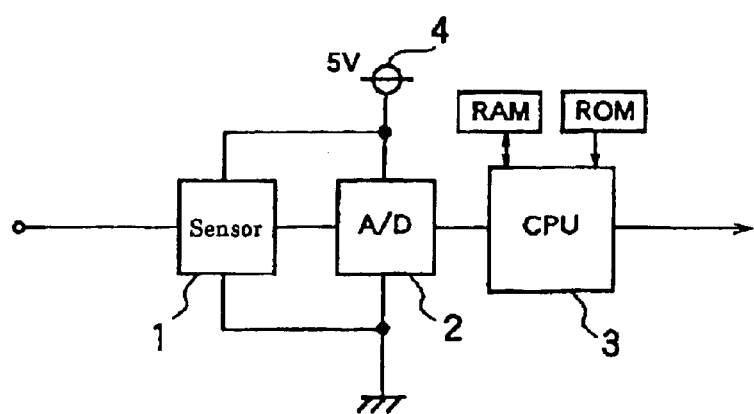
FIG. 11 is a block diagram showing the approximate composition of a conventional intake pressure detecting device.

FIG. 7 and FIG. 8 show a further embodiment of an intake pressure detecting device relating to the present invention, and in this embodiment, rather than providing an adjusting device such as in the foregoing description, a prescribed reference voltage and amplification factor are used by means of fixed resistances, and during manufacture, variation information relating to the output of the differential amplifier 14 (variation information for the individual intake pressure detecting sensor, and variation information for the computed resistance of the amplifying circuit), and the like, are stored electrically. When detecting the actual intake pressure, this stored information is referenced to determined the actual intake pressure value.

More specifically, as illustrated in FIG. 7, the intake pressure detecting device 60 relating to the present embodiment has a basic composition including an intake pressure detecting sensor 12, reference voltage power supply 13, differential amplifier 14, A/D converter 15, a CPU 16 as a calculation processing device, an EEPROM 61 as a storing device, and the like. It also includes a switch 62, or the like, as a determining device for determining whether or not to instruct the CPU 16 to store information to the EEPROM 61.

This intake pressure detecting device 60 is incorporated integrally in an ECU (engine control unit) 70, together with a ROM 17 for storing control programs or control data, a RAM 18 for temporarily holding intermediate calculation results, and the like.

In the aforementioned composition, the intake pressure detecting sensor 12, reference voltage power supply 13, differential amplifier 14, A/D converter 15, CPU 16, ROM 17, RAM 18, and the like, are the same as in the foregoing embodiments, and description thereof is omitted here.

It is possible to use an electrically writable device as a storing device for electrically storing the variation information for the output from differential amplifier 14, and the like. Therefore, a small-capacity, electrically erasable and writable EEPROM may be employed, as in the present embodiment, or alternatively, the information may be written separately to an internal ROM, by using a flash ROM type MPU (micro processing unit). A program is stored in the ROM 17 for writing the output signal sent from the differential amplifier 14 via the A/D converter 15 into the EEPROM 61, in addition to the various information described above in the foregoing embodiment, when the switch 62 forming the determining means is ON.

Device calibration tasks for the intake pressure detecting device 60 are carried out in the inspection stage during manufacture. The design properties of the intake pressure detecting device 60 are as illustrated by the dotted line in FIG. 8.

Firstly, when a completely assembled intake pressure detecting device 60 is conveyed to the inspection stage, a calibration pressure source 63 disposed in the manufacturing line is connected to the intake pressure detecting sensor 12. A first calibration pressure P1 of 101.32 kPa, for example, (absolute pressure) is applied.

Here, the first calibration pressure P1 is desirably lower than the pressure corresponding to the reference voltage Vref, in other words, 106.7 kPa (absolute pressure). Supposing that this pressure of 106.7 kPa is applied, then if the intake pressure detecting device 60 exhibits fluctuation in such a manner that the sensor voltage output by the intake pressure detecting sensor 12 becomes greater than the reference voltage Vref, it will be difficult to perform accurate calibration. Consequently, the first calibration pressure P1 is desirably set to a lower pressure than the pressure corresponding to the reference voltage Vref.

Thereupon, when switch 62 is turned ON, the CPU 16 determines that there is a write instruction, and using the program stored in the ROM 17, if the input value to A/D converter 15 is equal to or less than a prescribed threshold value (for example, 1V), then the A/D converted digital value A corresponding to the input value, and the pressure value, are stored as storage information 1 (pressure value: 106.7 kPa/digital value: A) in the EEPROM 61.

The switch 62 is then turned OFF, and another calibration pressure source 64 disposed in the manufacturing line is connected to the intake pressure detecting sensor 12 instead of the calibration pressure source 63. A second calibration pressure P2 of 81.3 kPa (absolute pressure), for example, is applied.

When the switch 62 is then turned ON, the CPU 16 determines that there is a write instruction, and using the program stored in the ROM 17, if the input value to the A/D converter 15 exceeds a prescribed value (for example, 1V), then an A/D converted digital value B corresponding to this input value, and the pressure value, are stored as storage information 2 (pressure value: 81.3 kPa/digital value: B) in the EEPROM 61.

Thereupon, the switch 62 is turned OFF, the calibration pressure source 64 is disconnected from the intake pressure detecting sensor 12, and the calibration data storage processing, in other words, the calibration work, terminates.

Thereby, using the aforementioned storage information 1 and storage information 2, the actual characteristics of the intake pressure detecting device 60, namely, the characteristics of the straight line passing through points Q1 and Q2 illustrated by the solid line in FIG. 8, are stored.

In other words, by applying previously known prescribed pressure values, for example, at least the two calibration pressure values P1, P2, to the intake pressure detecting sensor 12, information relating to the signal output from the differential amplifier 14, in other words, the actual detection characteristics of the intake pressure detecting sensor 12 and differential amplifier 14 are stored in advance in the EEPROM 61 as a storing device.

If an intake pressure detecting device 60 which has completed calibration tasks as described above is applied to an engine and used in practice, then pressure detection is performed by the intake pressure detecting sensor 12, and when a certain A/D converted value (digital value) is output, the actual intake pressure Pin is calculated by the CPU 16 as a calculation processor, on the basis of this output value. In other words, the detection information, and the storage information stored previously in the EEPROM 61.

Consequently, if there is a difference between the designed detection characteristics and the actual detection characteristics (namely, a difference between the designed detection characteristics and the actual detection characteristics due to variation in the characteristics of the intake pressure detecting sensor 12 itself, or variation in the calculated resistance of the amplifier circuit, or the like,) then by performing progressive calibration on the basis of calculation processing, it is possible to detect the actual pressure Pin, rather than the pressure Pin' based on the design value, as illustrated in FIG. 8.

Accordingly, high-precision control can be implemented if the pressure information thus detected is used as a parameter for controlling the fuel injection volume.

Moreover, in the present embodiment, by adopting a switch 62 as a determining device for determining whether or not an information write instruction is sent to the storing device, the storing operation to the EEPROM 61 as the storing device can be performed reliably at all times.

The intake pressure detecting device according to an embodiment of the present invention can of course also be achieved in a composition which does not incorporate a determining device (e.g. switch 62).

The other operations of the intake pressure detecting device 60 relating to this embodiment and the operations of the control system including this intake pressure detecting device 60 are essentially the same as those relating to the previous embodiments, and hence further description thereof is omitted here.

As described above, according to the intake pressure detecting device of the internal combustion engine relating to an embodiment of the present invention, it is possible to detect intake pressure with high accuracy, whilst achieving cost reductions, even in a two-cycle engine, small-exhaust capacity single-cylinder engine, or the like, having relatively small intake negative pressure, by using a commonly known intake pressure detecting sensor developed for use in an engine having a relatively large intake negative pressure, such as a four-cycle engine mounted in an automobile, or the like.

By previously storing the detection characteristics of the intake pressure detecting device and comparing and calibrating the actual detection information on the basis of this stored information, it is possible to perform detection of even greater accuracy.

Thereby, the fuel injection volume, and the like, of the engine can be controlled to a high degree of accuracy, in accordance with various operational states of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake pressure detecting device for an internal combustion engine for detecting the intake pressure in the intake pipe as information for controlling the operational state of the internal combustion engine, comprising:
   an intake pressure detecting sensor for detecting the absolute pressure of the intake air;
   a reference voltage power supply for supplying a prescribed reference voltage;
   a differential amplifier for amplifying the differential between the output voltage from said intake pressure detecting sensor and the reference voltage from said reference voltage power supply; and
   an A/D converter for converting the analogue signal output by said differential amplifier into a digital signal, wherein said reference voltage is set to the same voltage as the output voltage output by said intake pressure detecting sensor when a prescribed pressure greater than a standard atmospheric pressure is applied.

2. The intake pressure detecting device for an internal combustion engine according to claim 1, wherein the amplification factor of said differential amplifier is set within a range where the amplified output signal does not exceed the input range of said A/D converter.

3. The intake pressure detecting device for an internal combustion engine according to claim 1, comprising reference voltage adjusting means capable of adjusting the reference voltage of said reference voltage power supply.

4. The intake pressure detecting device for an internal combustion engine according to claim 1, comprising amplification factor adjusting means capable of adjusting the amplification factor of said differential amplifier.

5. The intake pressure detecting device for an internal combustion engine according to claim 1, wherein the amplification factor of said differential amplifier is set within a range where the amplified output signal does not exceed the input range of said A/D converter.

6. The intake pressure detecting device for an internal combustion engine according to claim 1, comprising reference voltage adjusting means capable of adjusting the reference voltage of said reference voltage power supply.

7. The intake pressure detecting device for an internal combustion engine according to claim 6, comprising amplification factor adjusting means capable of adjusting the amplification factor of said differential amplifier.

8. The intake pressure detecting device for an internal combustion engine according to claim 6, wherein the amplification factor of said differential amplifier is set within a range where the amplified output signal does not exceed the input range of said A/D converter.

9. The intake pressure detecting device for an internal combustion engine according to claim 1, comprising amplification factor adjusting means capable of adjusting the amplification factor of said differential amplifier.

10. The intake pressure detecting device for an internal combustion engine according to claim 9, wherein the amplification factor of said differential amplifier is set within a range where the amplified output signal does not exceed the input range of said A/D converter.

11. The intake pressure detecting device for an internal combustion engine according to claim 1, comprising:
    storing means for previously storing information relating to the signal output by said differential amplifier when a known prescribed pressure value is applied to said intake pressure detecting sensor; and
    calculation processing means for calculating the actual intake pressure on the basis of the storage information stored by said storing means and the detection information actually detected by said intake pressure detecting sensor.

12. The intake pressure detecting device for an internal combustion engine according to claim 11, comprising determining means for determining the presence or absence of an information write instruction to said storing means.

13. An intake pressure detecting device for an internal combustion engine for detecting the intake pressure in the intake pipe as information for controlling the operational state of the internal combustion engine, comprising:
    an intake pressure detecting sensor for detecting the absolute pressure of the intake air;
    a reference voltage power supply for supplying a prescribed reference voltage;
    a differential amplifier for amplifying the differential between the output voltage from said intake pressure detecting sensor and the reference voltage from said reference voltage power supply;
    an A/D converter for converting the analogue signal output by said differential amplifier into a digital signal;
    storing means for previously storing information relating to the signal output by said differential amplifier when a known prescribed pressure value is applied to said intake pressure detecting sensor; and
    calculation processing means for calculating the actual intake pressure on the basis of the storage information stored by said storing means and the detection information actually detected by said intake pressure detecting sensor.

14. The intake pressure detecting device for an internal combustion engine according to claim 13, wherein the amplification factor of said differential amplifier is set within a range where the amplified output signal does not exceed the input range of said A/D converter.

15. The intake pressure detecting device for an internal combustion engine according to claim 13, comprising determining means for determining the presence or absence of an information write instruction to said storing means.

16. The intake pressure detecting device for an internal combustion engine according to claim 15, wherein the amplification factor of said differential amplifier is set within a range where the amplified output signal does not exceed the input range of said A/D converter.

17. An intake pressure detecting device for detecting the intake pressure in an intake pipe as information for controlling the operational state of an engine, comprising:

intake pressure detecting sensor means for detecting the absolute pressure of the intake air;

reference voltage power supply means for supplying a prescribed reference voltage; and differential amplifier means for amplifying the differential between the output voltage from the intake pressure detecting sensor means and the reference voltage of the reference voltage power supply means, wherein said reference voltage is set to the same voltage as the output voltage output by said intake pressure detecting sensor means when a prescribed pressure greater than a standard atmospheric pressure is applied.

18. The intake pressure detecting device for an internal combustion engine according to claim 17, further comprising:

amplification factor adjusting means for adjusting the amplification factor of said differential amplifier means.

19. The intake pressure detecting device for an internal combustion engine according to claim 17, further comprising:

storing means for previously storing information relating to the signal output by said differential amplifier means when a known prescribed pressure value is applied to said intake pressure detecting sensor means; and calculation processing means for calculating the actual intake pressure on the basis of the storage information stored by said storing means and the detection information actually detected by said intake pressure detecting sensor means.

20. The intake pressure detecting device for an internal combustion engine according to claim 19, further comprising:

determining means for determining the presence or absence of an information write instruction to said storing means.

21. The intake pressure detecting device for an internal combustion engine according to claim 17, further comprising:

A/D converter means for converting an analogue signal output by the differential amplifier means to a digital signal.

22. The intake pressure detecting device for an internal combustion engine according to claim 21, wherein the amplification factor of said differential amplifier means is set within a range where the amplified output signal does not exceed the input range of said A/D converter means.

23. An internal combustion engine including the intake pressure detecting device of claim 21.

24. An internal combustion engine of claim 23, wherein the internal combustion engine is a single-cylinder engine.

25. An intake pressure detecting method for detecting the intake pressure in an intake pipe as information for controlling the operational state of an engine, comprising:

detecting the absolute pressure of the intake air from an intake pressure detecting sensor and establishing an output voltage;

supplying a prescribed reference voltage from a reference voltage power supply; and amplifying the differential between the output voltage directly supplied from the intake pressure detecting sensor and from the reference voltage power supply, wherein said reference voltage is set to the same voltage as the output voltage output by said intake pressure detecting sensor, when a prescribed pressure greater than a standard atmospheric pressure is applied.

26. The intake pressure detecting method of claim 25, wherein the amplifying is done in a differential amplifier, the method further comprising:

converting an analogue signal output by the differential amplifier to a digital signal.

27. The intake pressure detecting method of claim 26, further comprising:

adjusting the amplification factor of said differential amplifier.

28. The intake pressure detecting method of claim 26, further comprising:

storing information relating to the signal output by said differential amplifier when a known prescribed pressure value is applied to said intake pressure detecting sensor; and calculating the actual intake pressure on the basis of the storage information and the detection information actually detected.

29. The intake pressure detecting method of claim 28, further comprising:

determining the presence or absence of an information write instruction for storing information.

30. An internal combustion engine for performing the intake pressure detecting method of claim 26.

31. An internal combustion engine of claim 30, wherein the internal combustion engine is a single-cylinder engine.

* * * * *